United States Patent [19]

Popovic

[11] Patent Number: 4,742,573
[45] Date of Patent: May 3, 1988

[54] IDENTIFICATION CARD INCLUDING OPTICALLY POWERED ELECTRONIC CIRCUIT

[75] Inventor: Radivoje Popovic, Zug, Switzerland

[73] Assignee: LGZ Landis & Gyr Zug AG, Zug, Switzerland

[21] Appl. No.: 727,271

[22] Filed: Apr. 25, 1985

[30] Foreign Application Priority Data

May 3, 1984 [CH] Switzerland ............ 2150/84

[51] Int. Cl.$^4$ ............ H04B 9/00; G07D 7/00
[52] U.S. Cl. ............ 455/607; 455/605; 340/825.34; 340/825.54; 350/359; 235/454
[58] Field of Search ............ 455/605, 606, 607; 340/825.34, 825.54, 572; 235/436, 454, 487, 491; 343/6.5 LC, 6.5 SS, 6.8 R, 6.8 LC; 350/359, 363, 385, 386; 342/44, 42, 50, 51

[56] References Cited

U.S. PATENT DOCUMENTS

| | | | |
|---|---|---|---|
| 3,153,691 | 10/1964 | Kibler | 350/359 |
| 3,158,746 | 11/1964 | Lehovic | 250/199 |
| 3,584,220 | 6/1971 | Nomura et al. | 455/605 |
| 3,641,316 | 2/1972 | Dethloff et al. | 340/825.34 |
| 3,951,513 | 4/1976 | Masi | 350/386 |
| 3,989,942 | 11/1976 | Waddoups | 455/605 |
| 4,114,151 | 9/1978 | Denne et al. | 343/6.8 LC |
| 4,227,261 | 10/1980 | Robertsson | 455/605 |
| 4,432,614 | 2/1984 | McNeill et al. | 350/386 |
| 4,479,264 | 10/1984 | Lockett et al. | 455/605 |

FOREIGN PATENT DOCUMENTS

| | | | |
|---|---|---|---|
| 1499441 | 9/1967 | France | 350/386 |
| 868275 | 5/1961 | United Kingdom | 350/386 |
| 1529789 | 10/1978 | United Kingdom | . |

*Primary Examiner*—Robert L. Griffin
*Assistant Examiner*—Andrew J. Telesz, Jr.
*Attorney, Agent, or Firm*—Marmorek, Guttman & Rubenstein

[57] ABSTRACT

A card, such as a credit card or identification card, includes electronic circuitry which permits its identification by an identifying device. More particularly, optical radiation is transmitted from the identifying device to the card to be identified. The radiation is modulated with information by a modulating device included in the card and is retransmitted to the identifying device.

11 Claims, 2 Drawing Sheets

IDENTIFICATION CARD INCLUDING OPTICALLY POWERED ELECTRONIC CIRCUIT

FIELD OF INVENTION

This invention relates to means for identifying a plastic card such as a credit card or an identification card. More particularly, the invention relates to a card to be identified, which is capable of transmitting information to an identifying device without contact with the identifying device.

BACKGROUND OF THE INVENTION

German Patent DE-OS 2,031,085 discloses an electronic circuit which is enclosed in a generally flat body such as an identification card or credit card to be identified by means of an identifying device. Power is supplied to the electronic circuit in the flat body by means of a radiation source in the identifying device and a photocell in the flat body to be identified.

It is an object of the present invention to provide a card to be identified by an identifying device, which card is capable of optically receiving information from the identifying device and is capable of optically transmitting information to the identifying device.

SUMMARY OF THE INVENTION

The present invention is a card such as an identification card or a credit card which is to be identified by an identifying device. The card includes electronic circuitry which enables the card to optically receive information from the identifying device and optically transmit information to the identifying device without contact with the identifying device. The electronic circuitry in the card is powered by optical radiation transmitted from the identifying device.

In a particular embodiment of the invention, the card includes a radiation modulating element for optically transmitting information to the identifying device. The modulating element receives unmodulated radiation from the identifying device, encodes information onto the radiation under control of a microprocessor, and retransmits the radiation back to the identifying device. Illustratively, the modulating element is a semiconductor device in which incident radiation is multiply reflected within a layer of semiconductor material.

DETAILED DESCRIPTION OF THE INVENTION

Figure 1:
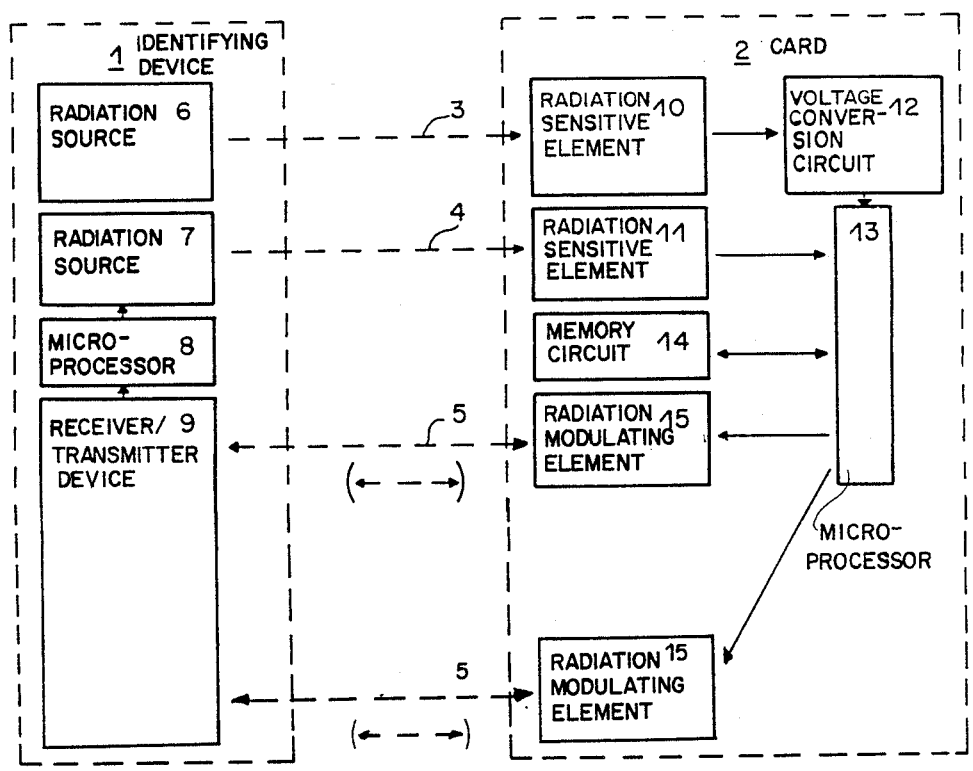
FIG. 1 schematically illustrates a card such as a credit card or identification card to be identified by an identifying device in accordance with an illustrative embodiment of the invention.

The block diagram of FIG. 1 schematically illustrates an identifying device 1 and a generally flat body 2. Typically, the flat body 2 is a card such as an identification card or credit card. The identifying device 1 serves to identify the card 2. In an illustrative embodiment of the invention, the identifying device 1 may include a slit (not shown) for receiving the card 2 to be identified by the identifying device 1.

There are three contact free optical transport paths between the identifying device 1 and the card 2. Radiation is transmitted from the identifying device 1 to card 2 over the transmission paths 3 and 4. Other transmission path 5 radiation may be transmitted from the identifying device 1 to the card 2 and back from the card 2 to the identifying device 1. This is indicated by the double-headed arrow located adjacent transmission path 5 in FIG. 1.

The identifying device 1 comprises a first radiation source 6 which preferably emits infrared radiation for transmission to the card 2 over the transmission path 3. The radiation source 6 may emit optical power of uniform intensity or optical power with intensity variations. A second radiation source 7 emits infrared radiation for transmission to the card 2 over transmission path 4. The radiation emitted from the radiation source 7 may be modulated under the control of microprocessor 8 with information to be transmitted to the card 2 over transmission path 4. The device 9 includes a radiation sensitive means for receiving modulated radiation from card 2 and may also include a radiation source for transmitting radiation to the card 2. The device 9 can transmit coded signals to the microprocessor 8 in response to modulated radiation received from the flat body 2. The identifying device 1 includes a conventional power supply (not shown) for supplying power to the electronic components incorporated therein.

Preferably, the card 2 is a multilayered plastic card in which an electronic circuit is embedded in known fashion. Preferably, the circuit is an integrated circuit formed on a single chip.

The electronic circuit incorporated into the card 2 comprises a first radiation sensitive element 10, a second radiation sensitive element 11, a voltage conversion circuit 12, a microprocessor 13, a memory 14, and a radiation modulating element 15.

The first radiation sensitive element 10 is illustratively a solar cell or photo diode. The radiation sensitive element 10 preferably receives a continuous radiation beam from radiation source 6 of identifying device 1 and, in response, is capable of delivering a d.c. voltage of approximately one volt in a power range from 10 to 100 microwatts. The radiation sensitive element 10 may also receive radiation having intensity variations with a frequency in a range over one hundred kHz. In this case the radiation sensitive element 10 produces an a.c. voltage of about one volt, which is preferably filtered by means of a capacitor (not shown). A sufficiently high voltage for operation of the other electronic components comprising the card 2 is attained in the voltage conversion circuit 12 by means of a chopper and, possibly, a voltage-doubling circuit, followed by a rectifier. Such circuits are known and need not be further described. They serve mainly to supply power to the microprocessor 13, the memory circuit 14, and the radiation modulating element 15. The voltage produced by the first radiation sensitive element 10 can further be converted in the voltage conversion circuit 12 by means of ac/dc or dc/dc transformers, stabilizers or similar circuits into an appropriate voltage for the other electronic components comprising the card 2.

The radiation sensitive element 11 receives over transmission path 4 the coded radiation signals produced by the radiation source 7 in the identifying device 1. The coded radiation signals are converted into coded voltage pulses by the radiation sensitive element 11 for further processing in microprocessor 13. Typically, the signal/noise ratio of the encoded radiation pulses should be better than 10 and the response time of the circuitry is desirably better than 10 ms.

The microprocessor 13 may be used to compare the coded voltage pulses generated by the radiation sensitive element 11 with information stored in memory 14. Alternatively, the microprocessor 13 may be used to store the coded voltage pulses generated by the radiation sensitive element 11 in memory 14. The microprocessor 13 may in particular circumstances also causes the radiation modulating element 15 to become operative in response to signals received from the radiation sensitive element 11.

The memory circuit 14 may be used for a variety of purposes. If the memory is used to store identifying information relating to the card 2, approximately 100 bits of storage capacity are needed. More memory capacity will be needed if each card 2 to be identified contains individualized identifying information. If additional information is to be stored, still more memory capacity will be required. Typically, the memory circuit 14 is an erasable PROM, for example an electrically erasable PROM (EEPROM).

The radiation modulating element 15 receives over transmission path 5 a continuous radiation beam produced in identifying device 1. The radiation modulating element 15 modulates information onto the radiation beam received from identifying device 1 under the control of the microprocessor 13. The modulated radiation is then returned to the identifying device where it is detected by a radiation detector in the device 9. The signal returned to the identifying device has a signal/noise ratio over 3 and the response time of the detecting circuitry is advantageously less than 10 ms.

In particular embodiments of the invention, the card 2 may include more than one light modulating element 15. In this case a plurality of radiation beams are received from the identifying device 1 by the card 2 to be identified. Each of the radiation beams are modulated by one of the modulating elements 15 and retransmitted back to the identifying device 1. In this manner several streams of information can be transmitted in parallel from the card 2 to the identifying device 1.

Figure 2:
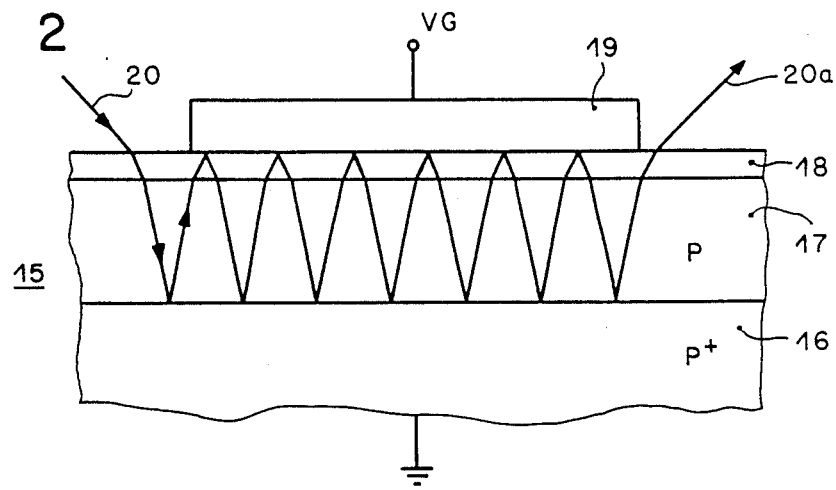
FIGS. 2, 3 and 4 schematically illustrate alternate forms of a radiation modulating element which may be incorporated in the card of FIG. 1.

One particular radiation modulating element is shown in FIG. 2. The modulating element 15 of FIG. 2 is an MOS device. A continuous infrared radiation source in identifying device 1 emits an infrared radiation beam 20 which is intensity-modulated in the card 2 by the modulating element 15.

The radiation modulating element 15 is constructed in four layers. On a highly doped P+-type substrate 16, a P-type layer 17 has been formed. The P-type layer 17 is covered by an SiO$_2$ layer 18 and is provided with a gate 19 which is formed from a conducting material such as metal. The substrate is connected to ground while a driving voltage VG is applied to the gate 19 by the microprocessor 13.

The modulating element 15 of FIG. 2 operates in the following way. A continuous beam 20 of infrared radiation is received by the modulating element 15 through openings in a screen (not shown), which screen is generally formed from a material which is opaque to the infrared radiation. The incident beam 20, after passing through the SiO$_2$ layer 18 of the modulating element 15 is multiply reflected between the substrate 16 and the gate 19. The radiation leaves modulating element 15 through openings in a second screen (not shown) as a modulated infrared beam 20a. This latter beam is transmitted over the transmission path 5 to device 9 of identifying device 1, which device includes a radiation sensitive cell.

If a sufficiently positive pulsed voltage VG is applied to gate 19 of modulating element 15 of card 2, the intensity of the radiation may be weakened during the multiple reflections because of absorption by charge carriers. The coded variations in the radiation intensity represent the information to be transferred from card 2 to the identifying device 1. Thus, the voltage VG can be used to encode information on the radiation beam 20. The coded information is detected by a radiation sensitive cell in device 9 and may then be transferred to the microprocessor 8 for further processing.

Figure 3:
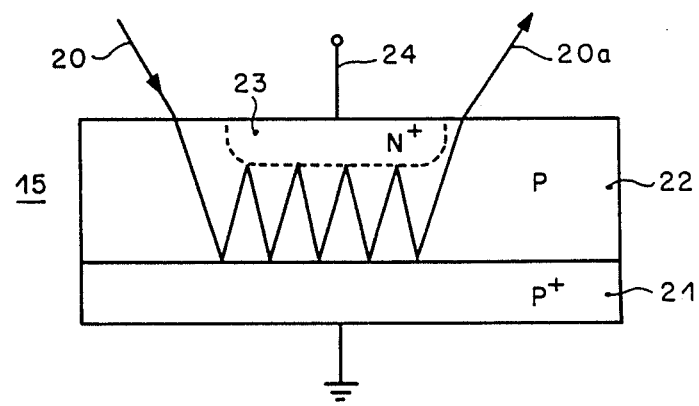

Instead of the MOS structure of FIG. 2, the modulating element 15 may be formed as a PN junction structure as shown in FIG. 3.

In the modulating element of FIG. 3, a P-type layer 22 is arranged on a P+-type substrate 21 which is strongly doped with impurity atoms. A strongly doped N+ type region 23 is formed as a trough in the P-type layer 22. The N+-type region 23 forms a control electrode. A connecting wire 24 is soldered to the N+-type region. The P+-type substrate is grounded.

In this embodiment, an entering infrared radiation beam 20 is multiply reflected within P-type layer between the P+-type substrate 21 and N+-type control electrode 23. The infrared radiation leaves the modulating element 15 as the modulated infrared beam 20a. The microprocessor 13 of the flat body 2 is used to apply positive voltage pulses to the control electrode 23. When a sufficiently positive voltage is applied to the control electrode 23, the radiation propagating in the layer 22 is scattered, thereby causing the outgoing infrared light beam 20a to have a reduced intensity. In this manner information to be transferred from the card 2 is encoded on the infrared radiation and transmitted to the identifying device 1.

Figure 4:
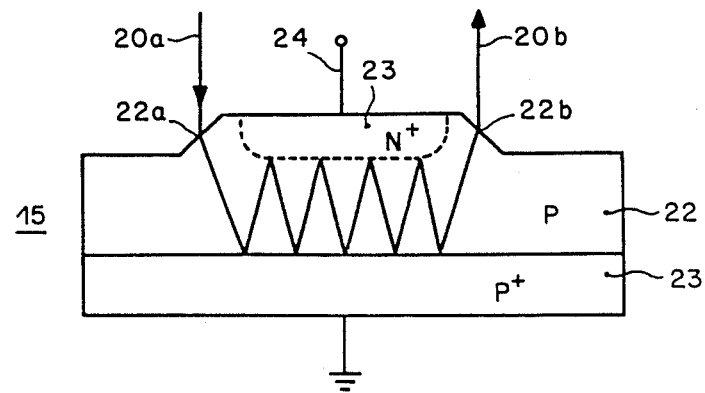

The modulating element 15 of FIG. 4 is constructed like that of FIG. 3. However, the surface of the P-type layer 22 is beveled at portions 22a and 22b in such a way that the incoming infrared radiation beam 20 and the outgoing infrared radiation beam 20a enter and exit perpendicularly to the remaining surface portions of the P-type layer 22.

The modulating elements of FIGS. 2 to 4 may also be formed from semiconductor materials which are doped oppositely to the semiconductor materials shown in FIGS. 2 to 4.

Finally, the above described embodiments of the invention are intended to be illustrative only. Numerous alternative embodiments may be devised by those skilled in the art without departing from the spirit and scope of the claims which follows:

I claim:

1. An identification card capable of transmitting information to and receiving information from an identifying device adapted to receive said card, said card comprising in the form of a single chip
   micro-processing means,
   means for receiving optical radiation from said identifying device and for converting said optical radiation to electrical power to supply said chip,
   means for receiving optical information from said identifying device and for converting said optical information to electrical information which is accessible to said microprocessing means, and
   means for modulating radiation received from and being sent back to said identifying device, said modulating means being comprised in a semiconductor modulating element within said chip, said modulating means including a modulating layer without direct electrical connection to said micro-processing means, said modulating layer including semiconductor material with a relatively low density of free charge carriers bordered on either side by layers having a relatively high density of free charge carriers, one of said layers with a high density of free charge carriers being connected to an output of said micro-processing means and the other layer with a high density of free charge carriers being connected to a fixed potential.

2. The card of claim 1 wherein said radiation modulating semiconductor element is an MOS-device.

3. The card of claim 1 wherein said semiconductor element comprises one P-N-junction.

4. The card of claim 1 wherein said card includes a plurality of modulating elements so that several streams of information can be transmitted in parallel from said card to said identifying device.

5. The card of claim 1 wherein said radiation receiving device supplying power to said micro-processing means is connected with a voltage conversion circuit.

6. The card of claim 1 wherein said means for receiving optical radiation supplying power to said chip receives a beam of radiation having intensity variations, caused by said identifying device, and wherein said means for receiving optical radiation is connected to a voltage multiplier circuit.

7. The card of claim 1 wherein said micro-processing means includes memory means.

8. An identifying device for transmitting information to and receiving information from an identification card as claimed in claim 1, said identifying device comprising
first means for transmitting a first beam of optical radiation to said card for power generation in said card,
second means for transmitting a second, modulated beam of optical radiation to said card for transmitting information to said card, said information being capable of being stored in memory means contained in said card, and
a device for transmitting a third beam of optical radiation to said card, said third beam of radiation being adapted to be information modulated in said card under control of a microprocessor contained in said card and transmitted from said card back to said identifying device.

9. The card of claim 1, wherein said modulating layer propagates said radiation by reflecting said radiation at both sides of said modulating layer and modulates said radiation by varying the free charge carrier density in said modulating layer under the control of said micro-processing means.

10. An identifying device for optically transmitting and receiving information from an identification card comprising powering means operable for producing electrical power from optical radiation, memory means and modulating means operable for modulating a received optical beam and thereafter transmitting the modulated optical beam,
said identifying device comprising
first means for transmitting a first beam of optical radiation to said card for producing electrical power in said powering means,
second means for transmitting a second beam of optical radiation to said card to provide information capable of being stored in said memory means, and
third means for transmitting to and receiving a third beam of optical radiation from said card, said third beam of radiation being transmitted from said third means for modulation in said modulating means and thereafter transmitted from said card back to said third means.

11. An identification system comprising an identification card and an identifying device adapted to interact with said card, said card comprising in the form of a single chip
micro-processing means,
means for receiving optical radiation from said identifying device to supply electrical power to said microprocessing means,
a radiation sensitive cell for receiving optical information from said identifying device and for converting said optical information into electrical information which is accessible to said micro-processing means, and
a radiation modulating semiconductor device capable of receiving optical radiation from said identifying device, said device including a modulating region including a layer of semiconductor material with a relatively low density of free charge carriers, said modulating region being bordered on either side by material having a relatively high density of free charge carriers which on at least one side is a semiconductor material, so that said radiation propagates generally along said modulating region by being reflected at both sides of said modulating layer, said modulation occurring by varying the charge carrier density in said modulating region under the control of said microprocessing means; and
said identifying device comprising
first means for transmitting a first beam of optical radiation to said card for producing electrical power in said card,
second means for transmitting a second beam of optical radiation to said card to provide information capable of being stored in said memory means, and
third means for transmitting to and receiving a third beam of optical radiation from said card, said third means of radiation being transmitted from said third means for modulation in said card and thereafter transmitted from said card back to said third means.

* * * * *